(No Model.)
H. OEHL.
ACETYLENE GAS GENERATING LAMP.
No. 606,228. Patented June 28, 1898.
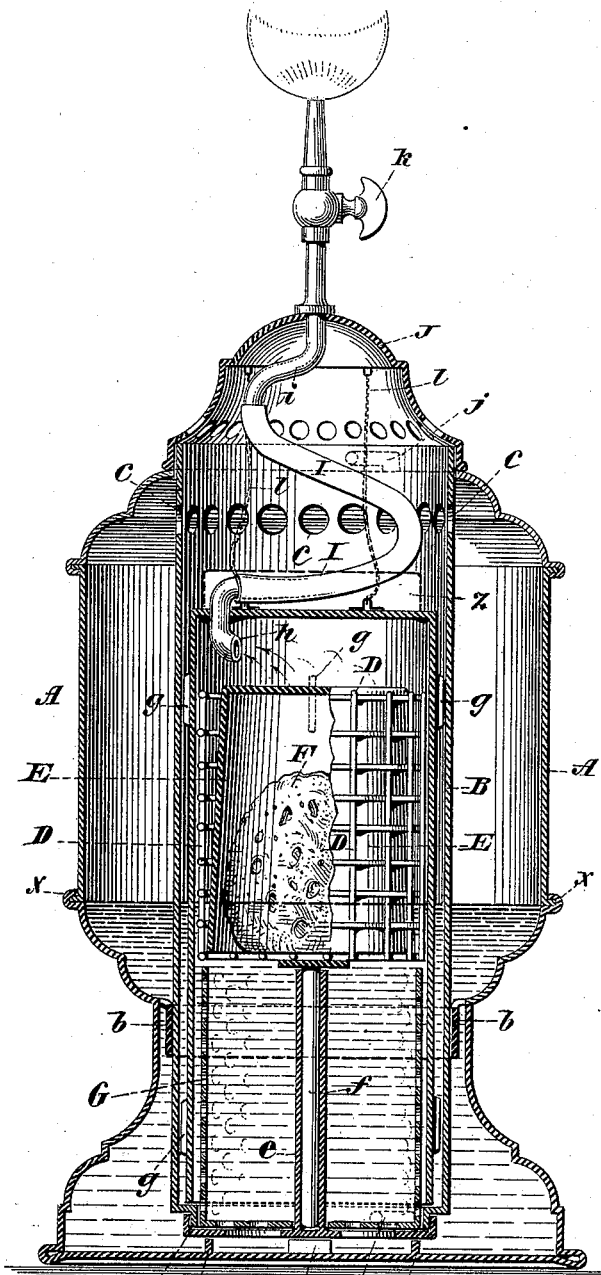
WITNESSES:
INVENTOR

UNITED STATES PATENT OFFICE.

HENRY OEHL, OF NEW YORK, N. Y.

ACETYLENE-GAS-GENERATING LAMP.

SPECIFICATION forming part of Letters Patent No. 606,228, dated June 28, 1898.

Application filed August 4, 1897. Serial No. 647,016. (No model.)

*To all whom it may concern:*

Be it known that I, HENRY OEHL, a resident of the city, county, and State of New York, have invented certain new and useful Improvements in Acetylene-Lamps, of which the following is a full, clear, and exact description.

My invention relates to lamps which are particularly adapted for burning acetylene gas; and the object of said invention is to produce a simple, cheap, and efficient lamp for burning acetylene gas and wherein there is no liability of an explosion taking place.

To these ends my invention consists in the novel arrangement and combination of parts hereinafter described and claimed.

In the accompanying drawing the figure is a central vertical sectional view of an acetylene-lamp made in accordance with my invention.

The outer shell or water-containing casing A may be of any desired construction, which is provided with a proper water-containing chamber at the base. Within the outer shell or casing A is supported a removable guide or cylinder B, which preferably extends from the top to the bottom of the lamp. However, in practice it has been found advantageous to project the cylinder beyond the casing, so that the line of perforations in the cylinder will communicate directly with the atmosphere. The cylinder B is supported in place in the outer casing by studs $a$, projecting from the bottom thereof, so as to allow a free circulation of water to the interior of the cylinder. A ring $b$ is supported by arms projecting from the casing A and tends also to support and maintain the cylinder in place and at the same time to allow of a free circulation of water between the casing and cylinder. The cylinder B is preferably perforated at or near the upper end, as indicated at $c$, and is adapted to receive a spider C at the lower end thereof, which spider is removably secured to cylinder, as by a bayonet-joint $d$. From the center of this spider is an upwardly-extending sleeve or support $e$, with which a stem $f$, connected with a foraminous open-top cage or carbid-support, is adapted to coöperate to support the cage in position. Supported within this cage D is a hood E, which is preferably frusto-conical in form to facilitate the removal of the carbid F, which rapidly swells when wet. Below the cage D is supported a foraminous cup G, the openings in which are smaller than those in the cage D, so that such decomposed particles as may drop from the carbid through the cage will be caught in the cup. The bottom of this cup preferably rests upon the spider C and has a central perforation for the admission of the sleeve or support $e$.

Contained within the cylinder B is a vertically-movable gas-tank H, which surrounds the cage D and foraminous cup G, and which is slightly smaller in diameter than the cylinder B, so as to provide a chamber or recess between the wall thereof and the walls of said cylinder for the admission of water. By this means the gas-tank can move freely in the cylinder which constitutes a guide therefor. In order that the gas-tank will be properly centered in the cylinder and not be impeded in its movement therein, I may provide the said tank with studs $g$, which are interposed between the walls of the cylinder and the gas-tank. The upper end of the gas-tank is provided with a gas-outlet pipe or opening $h$, which, to obtain the best results, should be constructed substantially in the manner shown, so that there is no danger of decomposed particles of carbid being carried into contact therewith to choke the passage. This outlet pipe or opening is connected with a flexible pipe I, which is preferably coiled within the cylinder B and connected at its upper end with the burner-pipe $i$, which is connected to a perforated dome J, that may be removably secured to the cylinder, as by a bayonet-joint $j$. The gas-pipe $i$ is provided with a cock $k$, which controls the flow of gas, and chains $l$ may be used to connect the gas-tank and dome, so that the gas-tank may be removed with the dome and the strain not be borne by the flexible pipe I. It will be observed that the chains $l$ are of such a length that they do not interfere with the movement of the gas-tank up and down in the cylinder.

The lamp is charged by placing a cartridge or piece or carbid within the hood E in the inverted position. The cage D is next placed over the hood. The foraminous cup is then placed upon the spider C, with the sleeve $e$ projecting through the central aperture therein.

The stem $f$ of the cage is then placed in its supporting-sleeve $e$, and the spider is locked in place by the bayonet-joint connection upon the cylinder B, which may then be placed in position in the outer shell, it being understood that the casing or shell is first filled to a certain predetermined height with water. In the present instance this height is indicated by a beading $x$ on the casing. After the cylinder has been placed within the casing the gas-tank may be placed in position within the cylinder and the dome secured thereto.

The operation of the lamp is as follows: The weight of the gas-tank is such that it will displace the column of water contained within the cylinder as the gas-tank descends and in this manner prevents the water from coming into contact with the carbid F, and the generation of gas cannot take place. When necessary, an auxiliary weight $z$ may be provided to cause the tank to descend. When it is desired to ignite the lamp, it is merely necessary to open the cock $k$, so as to exhaust the air contained within the gas-tank, and as the air escapes water will be admitted to the interior of the gas-tank and into contact with the carbid, as represented in the drawing, when acetylene gas will be generated and conveyed from the gas-tank through the flexible connection to the burner, where the gas can be ignited and an intense steady white flame will be given forth. It will be seen that the movable gas-tank compensates for a variation in the generation and provides a steady regular pressure at the burner. However, should there be an excessive generation of gas within the tank there is not the slightest danger of explosion, since the pressure of gas within the gas-tank would displace the water therein and the generation would be gradually decreased, because of the water being forced out of contact with the carbid. However, as the pressure decreases in the gas-tank the water will again enter and reach contact with the carbid, when the generation of gas again continues as before. In order to stop the generation of gas, it is merely necessary to lift the dome, together with the cylinder connected therewith, until the lower end of the cylinder is above the supporting-ring $b$ on the casing, when a slight lateral movement of the cylinder will cause its lower end to bear upon the ring, and the cylinder may be held in this position by the ring, so that the carbid is maintained out of contact with the water, and generation of gas cannot take place. When the cylinder is again lowered to its normal position, the air or gas contained within the gas-tank will prevent the water from entering it until the cock $k$ is again opened and the air is allowed to escape, when the water will again enter the gas-tank and the generation of gas will again be resumed, as hereinbefore described.

The hood E performs a twofold purpose. It forms a "covering," so to speak, for the charge of carbid, and may in practice be made as a cartridge-covering, in which a predetermined amount of carbid is contained. In some cases the decomposed products of carbid or lime are light enough to be held in suspension or to float upon the water, and in such case the hood retains such of the decomposed particles of carbid as do not drop through the cage and have a tendency to float upon the water and which might interfere with the proper generation and distribution of gas.

It may be found desirable to cover the apertures in the dome J and cylinder or guide B with wire-gauze, so that any gas that might be forced through the water seal could not, if accidentally ignited, convey the flame to the interior of the lamp.

It will be observed that by my invention the entire interior construction of the lamp can be removed with the dome J, and that the various parts may be readily disconnected for the purpose of recharging, cleaning, or repair. The simplicity of the construction allows the lamp to be cleaned and the parts to be replaced with but little difficulty.

What I claim, and desire to secure by Letters Patent, is—

1. In an acetylene-lamp, the combination of a water-containing casing, a removable cylinder supported within said casing, a carbid-cage removably connected with the cylinder, and a gas-tank contained within said cylinder and adapted to surround said carbid-cage.

2. In an acetylene-lamp, the combination of a water-containing casing, a removable cylinder supported within said casing, a carbid-cage removably connected with the cylinder, and a gas-tank adapted to be guided by and move within the cylinder and to surround the carbid-cage.

3. In an acetylene-lamp, the combination of a water-containing casing, a removable cylinder supported within said casing, a carbid-cage removably connected with the cylinder, a gas-tank adapted to be guided by and move within the cylinder and to surround the carbid-cage, a supply-pipe connected with the lamp, and a flexible connection between the supply-pipe and the gas-tank.

4. In an acetylene-lamp, the combination of a water-containing casing, a removable cylinder supported within said casing, a carbid-cage removably connected with the cylinder, a hood fitting within said cage and adapted to surround the carbid therein, a gas-tank adapted to be guided by and move within the cylinder and to surround the carbid-cage, and a supply-pipe connected with the lamp, and a flexible connection between the supply-pipe and the gas-tank.

5. In an acetylene-lamp, the combination of a water-containing casing, a removable cylinder supported within said casing, a carbid-cage removably connected with the cylinder, a foraminous cup supported by said cylinder below the cage, a gas-tank adapted to be guided by and move within the cylinder and to surround the carbid-cage, a supply-pipe connected with the lamp, and a flexible connection between the supply-pipe and the gas-tank.

6. In an acetylene-lamp, the combination of a water-containing casing, a removable cylinder supported within said casing, a carbid-cage, a spider removably secured to the cylinder and adapted to connect with the carbid-cage to support the same in place, and a gas-tank adapted to be guided by and move within the cylinder and to surround the carbid-cage.

7. In an acetylene-lamp, the combination of a water-containing casing, a removable cylinder supported within said casing, a dome removably secured to the cylinder and provided with a gas-supply pipe, a carbid-gage, a spider removably secured to the cylinder and adapted to connect with the carbid-cage to support the same in place, a gas-tank adapted to be guided by and move within the cylinder and to surround the carbid-cage, and a flexible connection between said gas-tank and the gas-supply pipe.

8. In an acetylene-lamp, the combination of a water-containing casing, a carbid-support normally below the normal water-level in said casing, a gas-tank surrounding said carbid-support, a cylinder within which said gas-tank is adapted to move, and a guiding or supporting ring connected to the casing and adapted to maintain the cylinder elevated and the carbid out of contact with the water.

HENRY OEHL.

Witnesses:
CHARLES E. SMITH,
ISAAC A. LEVY.